(12) United States Patent
Masuda et al.

(10) Patent No.: US 7,433,069 B2
(45) Date of Patent: Oct. 7, 2008

(54) IMAGE TRANSMISSION METHOD AND ITS APPARATUS

(75) Inventors: Koji Masuda, Kodaira (JP); Tomohiro Aikawa, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 903 days.

(21) Appl. No.: 10/849,988

(22) Filed: May 21, 2004

(65) Prior Publication Data
US 2005/0025048 A1  Feb. 3, 2005

(30) Foreign Application Priority Data
May 23, 2003  (JP) .............................. 2003-145677

(51) Int. Cl.
G06F 3/12 (2006.01)
G06F 15/00 (2006.01)
(52) U.S. Cl. .................. 358/1.15; 358/409; 358/539; 358/426.01; 358/426.02; 358/465; 358/471; 375/240.01; 714/712
(58) Field of Classification Search ................ 358/1.15, 358/409, 539, 426.01, 426.02, 465, 471; 375/240.01; 714/712
See application file for complete search history.

(56) References Cited

U.S. PATENT DOCUMENTS

2002/0053053 A1* 5/2002 Nagai et al. .................. 714/712
2002/0054635 A1* 5/2002 Nagai et al. ............. 375/240.01
2004/0105494 A1* 6/2004 Aikawa et al. .......... 375/240.13
2005/0105604 A1* 5/2005 Ito et al. ...................... 375/225

FOREIGN PATENT DOCUMENTS

| JP | 11284659    | 10/1999 |
| JP | 2002-077260 | 3/2002  |
| JP | 200277260   | 3/2002  |
| JP | A-2003-309847 | 10/2003 |

OTHER PUBLICATIONS

U.S. Appl. No. 10/721,885, filed Nov. 26, 2003, "Entitled: A Video Data Transmission Method for Changing Transmission Data Amounts in Accordance With a Transmission Speed and a Transmission System Therefor".

* cited by examiner

Primary Examiner—Twyler L. Haskins
Assistant Examiner—Michael Burleson
(74) Attorney, Agent, or Firm—Mattingly, Stanger, Malur & Brundidge, P.C.

(57) ABSTRACT

An image transmission apparatus and method for use with at least two transmission paths having different transmission rates from one another. The image transmission apparatus comprises an image input for receiving an image signal, a coding processing unit for encoding the image signal, a protocol control unit for packetizing the data encoded by the coding processing unit to generate data packets for transmission, and a transmission unit for transmitting the data packets. The protocol control unit has at least one timer processing unit which controls a data packet transmission interval individually corresponding to the transmission rates of the respective transmission paths based on data packet discard ratio information from the transmission paths.

6 Claims, 8 Drawing Sheets

IMAGE TRANSMISSION METHOD AND ITS APPARATUS

CROSS-REFERENCE TO RELATED APPLICATIONS

The present application is related to U.S. patent application Ser. No. 10/721,885 entitled "A VIDEO DATA TRANSMISSION METHOD FOR CHANGING TRANSMISSION DATA AMOUNTS IN ACCORDANCE WITH A TRANSMISSION SPEED AND A TRANSMISSION SYSTEM THEREFOR," filed on Nov. 26, 2003. The disclosure of the above U.S. application is herein incorporated by reference.

INCORPORATION BY REFERENCE

The present application claims priority from Japanese application JP2003-145677 filed on May 23, 2003, the content of which is hereby incorporated by reference into this application.

BACKGROUND OF THE INVENTION

The present invention relates to an image transmission method and apparatus, and more particularly, to a motion video transmission method and apparatus for transmitting a compressed motion video over a network.

In a remote image monitoring system or an image delivery system, a need has been rapidly expanded for a motion video transmission apparatus for transmitting a motion video through an IP (Internet Protocol) network, as represented by a public line and the Interenet. For example, a conventional MPEG-4 based delivery of stream data (comprised of compressed data) of images involves encoding image data to be transmitted in accordance with MPEG-4 in an image transmission unit, and once storing the encoded image data in a storage of the image transmission unit as stream data. The image data may represent a still image, motion video, computer graphics (CG), animation, and the like, and may also include voice, audio, composite music, and the like. Such image data is delivered from the storage in response to a request from the network.

For delivering such image data, particularly, motion video, they must be digitized before transmission. However, since the digitization of image data results in an immense amount of information, motion video compression techniques are required for reducing the amount of the information to be transmitted. For this purpose, a global standard of compression such as MPEG-2 or MPEG-4, which has been conventionally well known, is used for compressing the motion video.

Now, description will be made on the MPEG-based image compression technique. Image data compressed in accordance with MPEG-2 or MPEG-4, i.e., stream data is comprised of an intra picture (hereinafter called the "I-picture"), a predictive picture (hereinafter called the "P-picture"), and a bidirectionally predictive picture (hereinafter called the "B-picture"). The stream data is compressed in three different encoding modes on a picture-by-picture basis. The I-picture refers to an encoded version of image data for a full frame of analog video within the frame. Therefore, upon receipt of an I-picture, an image receiver can reproduce a single I-picture alone. The P-picture refers to encoded data of only a difference resulting from a unidirectional interframe prediction from the preceding image data (I-picture or P-picture). Therefore, the image receiver can reproduce no image only with a received P-picture, and requires an I-picture, which bases the P-picture, for reproducing an image. Further, if an intermediate P-picture is missing, a resulting image will be collapsed, for example, including block distortion and the like. The B-picture refers to an encoded version of difference data resulting from a bidirectional interframe prediction from the preceding image data and the next image data. The B-picture is similar to the P-picture, in that the image receiver cannot reproduce an original image only with the B-picture. Since the P-picture and B-picture contribute to a reduction in the amount of compressed data because of a reduced redundancy in the time base direction with the preceding and subsequent pictures, but the image receiver cannot reproduce an original image only with the P- and B-pictures. A typical combination of MPEG-2 pictures is shown below by way of example:

(I) (B) (B) (P) (B) (B) (P) (B) (B) (P) (B) (B) (P) (B) (B) (I) (B) (B) (P) . . . .

Typically, an I-picture appears every 15 pictures, and this sequence is repeated, as can be seen above.

Figure 8:
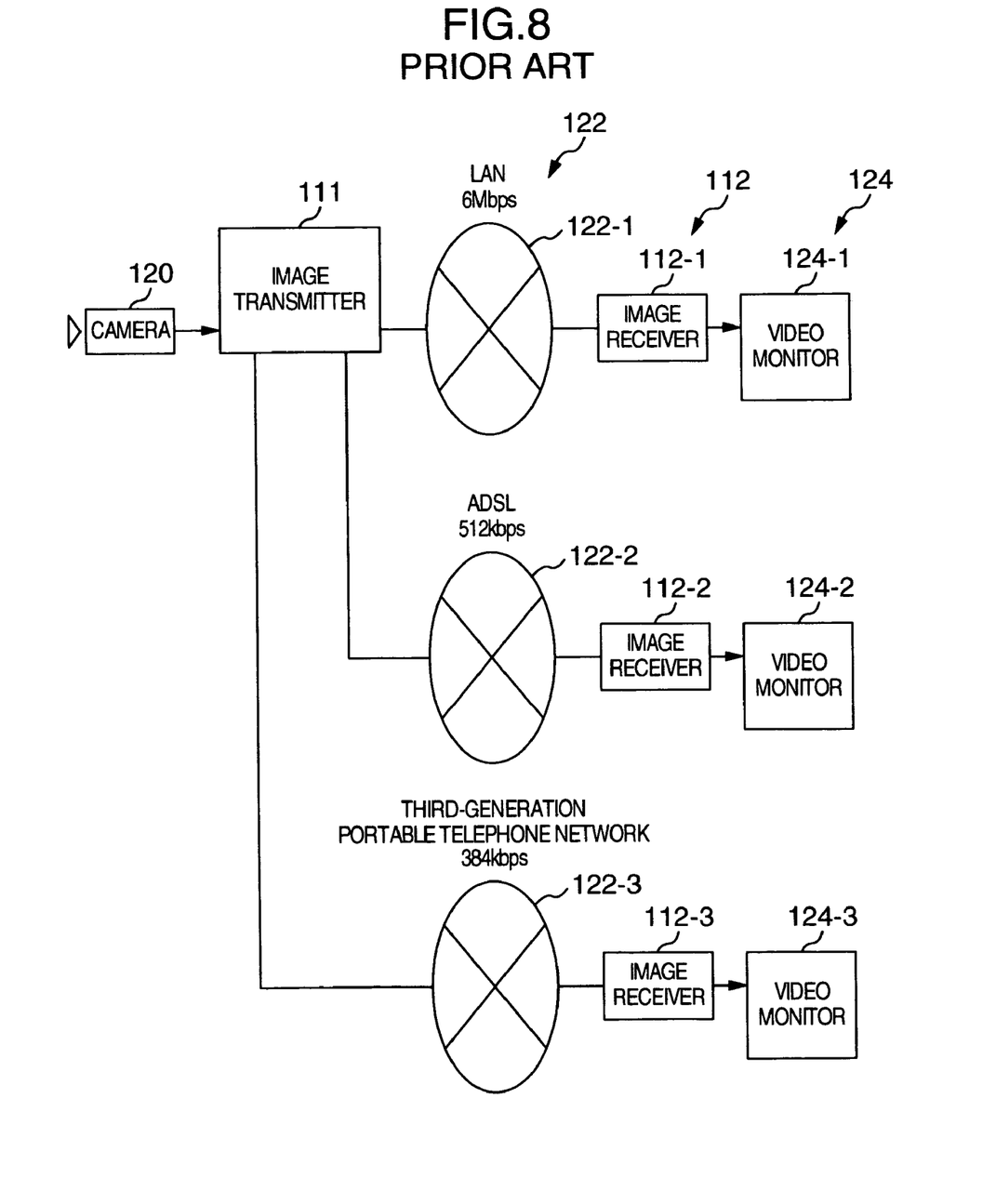
FIG. 8 is a block diagram illustrating an exemplary networked motion video delivery system.

Next, description will be made on a system for delivering a compressed motion video as mentioned above over a network. FIG. 8 illustrates a networked motion video delivery system described in JP-A-2003-309847 which has been previously proposed by the present inventors.

Referring to FIG. 8, a monitored image captured by a camera 120 is encoded by an image transmitter 111 such as an encoder, and delivered through a network 122 to respective image receivers 112-1, 112-2, 112-3 such as decoders which decode the encoded monitored image that is then displayed on image monitors 124-1, 124-2, 124-3, respectively.

The image transmitter 111 responsible for the compression of a motion video comprises a compression unit, disposed therein, which compresses the motion video at a predetermined bit rate (compression rate). The resulting compressed image data (stream) is transmitted to the image receivers 112-1, 112-2, 112-3, each of which decompresses the stream to restore the original image data which is outputted to an associated monitor. It should be noted that in FIG. 8, the output stream from the image transmitter 111 is directly transmitted to networks 122-1, 122-2, 122-3. This transmission scheme is called "unicast."

In operation of the foregoing system, the image receiver 112-1, for example, requests the image transmitter 111 for stream data through the network 122-1. The image transmitter 111 delivers the requested stream data to the requesting image receiver 112-1.

The image receiver 112-1 receives the stream data, decompresses the compressed stream data, displays the original data on the monitor 124-1, and records the original data in a recording unit (not shown) as required. Next, the image receiver 112-1 subsequently requests the image transmitter 111 for next stream data through the network 122-1.

The image transmitter 111 transmits the requested next stream data to the image receiver 112-1. The image receiver 112-1 receives the next stream data, decompresses the compressed stream data in a manner similar to the foregoing, displays the original data on the monitor 124-1, and records the original data in the recording unit as required.

The subsequent process is similar to the foregoing, and other image receivers 112-1, 112-3 also request for transmission of stream data, and receive and decompress received stream data in sequence.

Figure 9:
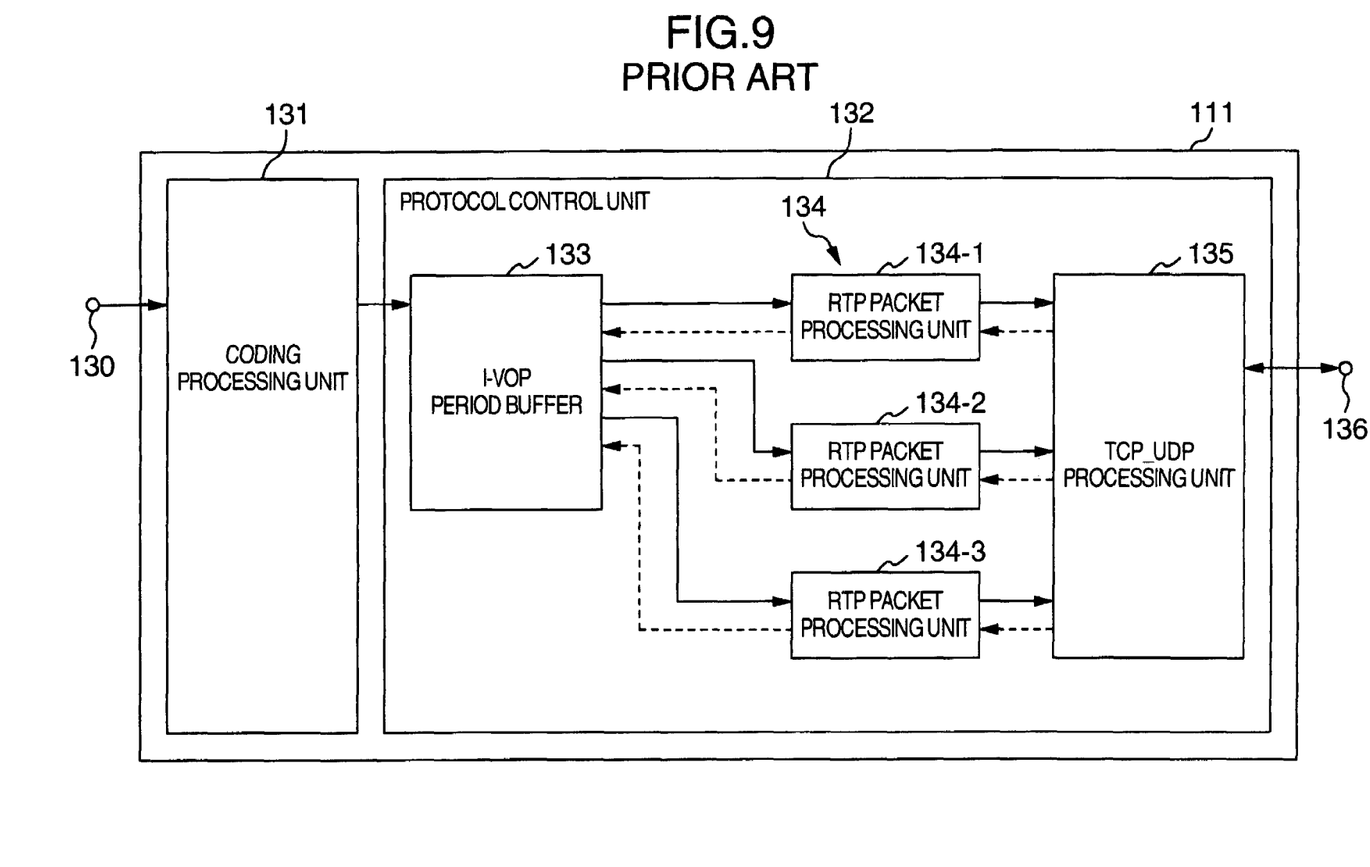
FIG. 9 is a block diagram illustrating an exemplary conventional image transmitter.

Next, the image transmitter 111 will be described in greater detail with reference to FIG. 9. In FIG. 9, a video signal from the camera 120 is applied to the image transmitter 111 through an input terminal 130. The image transmitter 111 comprises a coding processing unit 131 and a protocol control unit 132. While this example is described in connection with the coding processing unit 131 conforming to MPEG-4, the coding processing unit 131 is not limited to MPEG-4, but may be designed to comply with another coding scheme such as MPEG-2. The protocol control unit 132 comprises an I-VOP (Video Object Plane) period buffer 133; an RTP (real time transport protocol) packet processing units 134-1, 134-2, 134-3; and a TCP (transmission control protocol)_UDP (user datagram protocol) processing unit 135. The output of the TCP_UDP processing unit 135 is sent to each network 122 from an output terminal 136. While three RTP packet processing units are shown in FIG. 9, this is because the illustrated example includes three transmission path 122 at different transmission rates. Therefore, the number of the RTP packet processing units is not limited to three.

The protocol control unit 132 thus configured implements transmission rate adaptive packet transmission. The following description will be centered on this configuration. The I-VOP period buffer 133 is a type of buffer which has a sufficient capacity to store encoded data at least from one I-VOP (corresponding to an I-picture previously describe) to immediately before the next I-VOP.

The RTP packet processing unit 134 generates a packet suitable for transmission over a network, such as MPEG-4 encoded data. Specifically, the RTP packet processing unit 134 divides encoded data into one to several packets for each VOP for delivery to the next TCP_UDP processing unit 135 in accordance with the basic specifications of RTP.

The TCP_UDP processing unit 134 transmits the RTP packets to the network 122 in accordance with the connection-type TCP protocol or the connectionless-type UDP protocol. This selection can be remotely set by the user through a personal computer or the like.

The protocol control unit 132 is implemented by software mainly processed by a processor. The RTP packet processing unit 134 performs processing associated with three types of transmission paths 122 connected to the image receiver 112 for simultaneous delivery on a unicast basis.

The MPEG-4 based coding processing unit 131 receives a video signal, and generates MPEG-4 encoded data which is written into the I-VOP period buffer 133. The RTP packet processing unit 134 reads encoded data from the I-VOP period buffer 133 in response to a ready signal (indicated by a dotted line in FIG. 9) in accordance with a transmission rate from the TCP_UDP processing unit 135. Specifically, each of the RTP packet processing units 134-1, 134-2, 134-3 reads an amount of data in accordance with the transmission path rate (transmission rate) to the image receiver 112-1, 112-2, 112-3 associated therewith. In this event, image data is necessarily discarded in the I-VOP period buffer 133 for lower rate transmission paths. In this way, the image data is automatically transmitted at the transmission rate of an associated transmission path.

The TCP-UDP processing unit 135 generates the ready signal in accordance with the transmission rate in a different way according to a selected protocol. When the TCP protocol is selected, the ready signal in accordance with the transmission rate can be automatically generated by a response to packets transmitted from the coding processing unit 131 because the TCP protocol is a connection type.

With the UDP protocol, on the other hand, the ready signal cannot be automatically generated because the UDP protocol is a connectionless type. Therefore, the TCP_UDP processing unit 135 collects packet discard ratio information periodically transmitted from the image receiver 112. The TCP_UDP processing unit 135 controls the packet transmission rate based on the periodic information such that the packet discard ratio is reduced to zero, and generates the ready signal in accordance with the transmission rate control. In this way, the TCP_UDP processing unit 135 can generate the ready signal in accordance with a particular transmission rate.

Here, the packet discard ratio can be calculated from an expected number of received RTP packets and the number of actually received packets. The expected number of received packets refers to the number of packets delivered from a transmitter, including delayed packets and duplicated packets. The period extends from the reception of the preceding RTCP packet to the reception of the current RTCP packet. The number of packets is calculated from a maximum sequence number and a minimum sequence number of received packets. The sequence number represents the order of a packet included in an RTP header (see RFC1889 for details).

(Expected Number of Received Packets)=(Maximum Sequence Number)−(Minimum Sequence Number)+1

The packet discard ratio is calculated in the following manner.

(Number of Discarded Packets)=(Expected Number of Received Packets)−(Number of Actually Received Packets)

(Packet Discard Ratio)=((Number of Discarded Packets)/(Expected Number of Received Packets))× 255

While the interval at which the discard ratio is transmitted is described in detail in the calculation of A.7RRCP transmission interval in RFC1889, the discard ratio is information included in the header of an RR packet, and is transmitted at intervals of approximately five seconds.

Next, detailed description will be made on how image data is discarded when it is transmitted from a higher bit-rate transmission path to a lower bit-rate transmission path as mentioned above.

Figure 3:
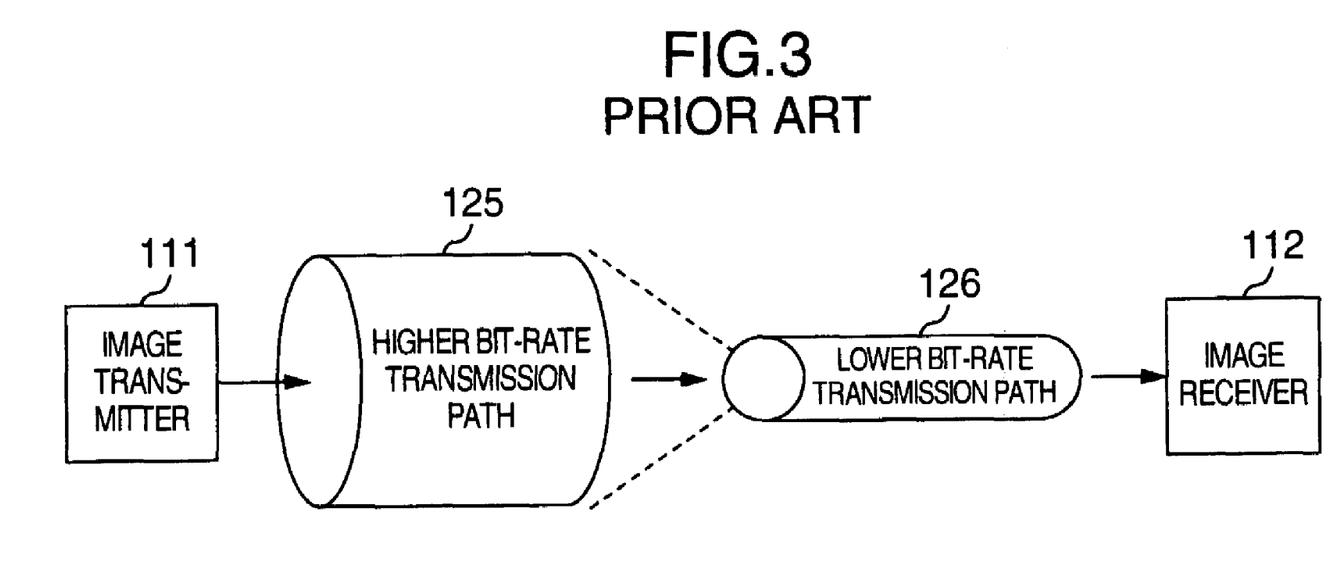
FIGS. 3 and 4 are diagrams for explaining the principle of discard of image data in the prior art.
Figure 4:
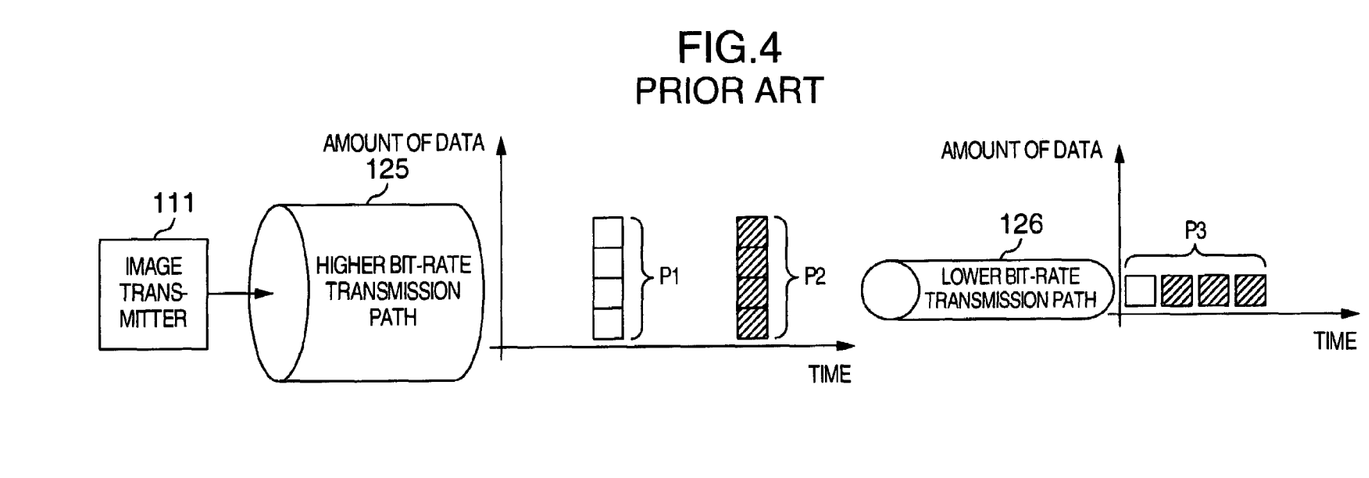

FIG. 3 illustrates an exemplary scenario in which image data should be discarded, which will be described below. Specifically, in FIG. 3, image data is transmitted from the image transmitter 111 to a image receiver 112. The image data used herein refers to encoded image data. When image data is transmitted from the image transmitter 111 to the image receiver 112, the image data should be sent through a higher bit-rate transmission path (including a network, which is also applied to the following) 125 and a lower-rate transmission path 126. In this event, part of image data should be discarded because the bit rate is lower on the lower bit-rate transmission path 126 than on the higher bit-rate transmission path 125. Describing in greater detail, the aforementioned image data transmission method manages encoded image data in units of pictures as mentioned above, so that bursty encoded data indicated by P1, P2 is transmitted on the higher bit-rate transmission path 125 (for example, at transmission rate of 1 Mpbs) as illustrated in FIG. 4. On the lower bit-rate transmission path 126 (for example, at transmission rate of 384 Kbps), on the other hand, the encoded image data is transmitted at a lower bit rate, as indicated by P3, so that part of the encoded image data is discarded. It should be noted that, other than a high bit-rate transmission path as mentioned above, data could be discarded, for example, when it is transmitted from a network, the transmission rate of which is 320 Kbps, to a general public line, the transmission rate of which is 38.8 Kbps.

Since encoded image data is retransmitted when the TCP protocol is used, no problem will arise even if part of encoded image data is discarded. However, since there is no guarantee to send encoded image data to a recipient when the UDP protocol is used, bursty encoded image data can be frequently discarded with the UDP protocol. Consequently, the encoded image data cannot be correctly transmitted as the case may be. To address this problem, it is necessary to control the generation of the ready signal used to request picture data so that averaged encoded image data is transmitted.

JP-A-2002-77260 (pages 4-5 and FIGS. 1, 2) shows a system and method for image transmission which avoids discarding encoded image data, wherein a transmission timing is delayed in order to transmit packet data at intervals of predetermined time or more.

SUMMARY OF THE INVENTION

As described above, the use of the UDP protocol implies a problem of frequently discarded images without guarantee to send the encoded image data to the recipient with certainty, resulting in a failure in receiving the encoded image data required by the recipient. Also, JP-A-20002-77260 involves complicated processing and a large circuit scale because a delay time is calculated from the size of packet data, the bandwidth of a previously set network, and a minimum delay time.

It is an object of the present invention to provide an image transmission method and apparatus which are capable of correctly transmitting encoded image data requested by a recipient.

It is another object of the present invention to provide an image transmission method and apparatus which are capable of transmitting averaged encoded image data in units of time instead of transmission of bursty data.

It is another object of the present invention to provide an image transmission method and apparatus which are capable of reducing discarded packets on a lower bit-rate transmission path to enable transmission of encoded image data on such a transmission path.

It is a further object of the present invention to provide an image transmission method and apparatus which are capable of transmitting encoded image data even with a temporary failure on a transmission path such as concentrated transmission loading.

An image transmission apparatus of the present invention includes image input means for receiving an image signal, a coding processing unit for encoding the image signal, a protocol control unit for packetizing the data encoded in the coding processing unit for transmission, and transmitting means for transmitting the data packets created by the protocol control unit. The protocol control unit has at least one timer processing unit which is configured to control an interval at which the data packets are transmitted individually corresponding to the transmission rate of a particular transmission path based on data packet discard ratio information from the transmission path.

In the image transmission apparatus of the present invention, the protocol control unit further includes a trigger generator which is configured to generate a trigger pulse for re-setting the timer processing unit at predetermined time intervals.

Further, in image transmission apparatus of the present invention, the protocol control unit further includes a table which sets the discard ratio and delay times, such that the timer processing unit sets a delay time based on the table.

An image transmission method of the present invention is provided for transmitting encoded image data in the form of packet over at least two transmission paths having different transmission rates from one another. The method includes the steps of receiving an image signal, converting the image signal into encoded data, packetizing the encoded data to generate packet data for transmission, setting a transmission interval based on discard ratio information from the transmission paths, and transmitting the packet data at the set transmission intervals individually corresponding to the transmission rates of the respective transmission paths.

Other objects, features and advantages of the invention will become apparent from the following description of the embodiments of the invention taken in conjunction with the accompanying drawings.

DETAILED DESCRIPTION OF THE EMBODIMENTS

Figure 5:
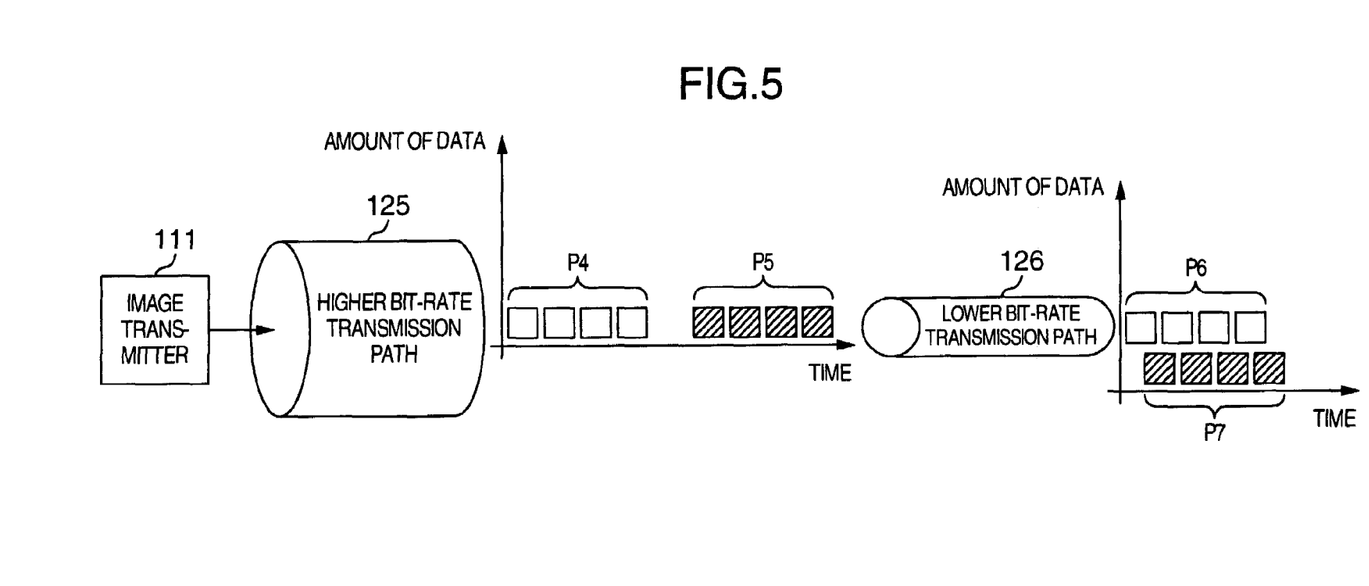
FIG. 5 is a diagram for explaining the principle of the present invention.

First, the principle of the present invention will be described with reference to FIG. 5. In FIG. 5, when encoded image data is transmitted from a higher bit-rate transmission path 125 to a lower bit-rate transmission path 126, the encoded image data transmitted from the higher bit-rate transmission path 125 is distributed for transmission to the lower bit-rate transmission path 126. In the following, this strategy will be discussed in detail.

Figure 1:
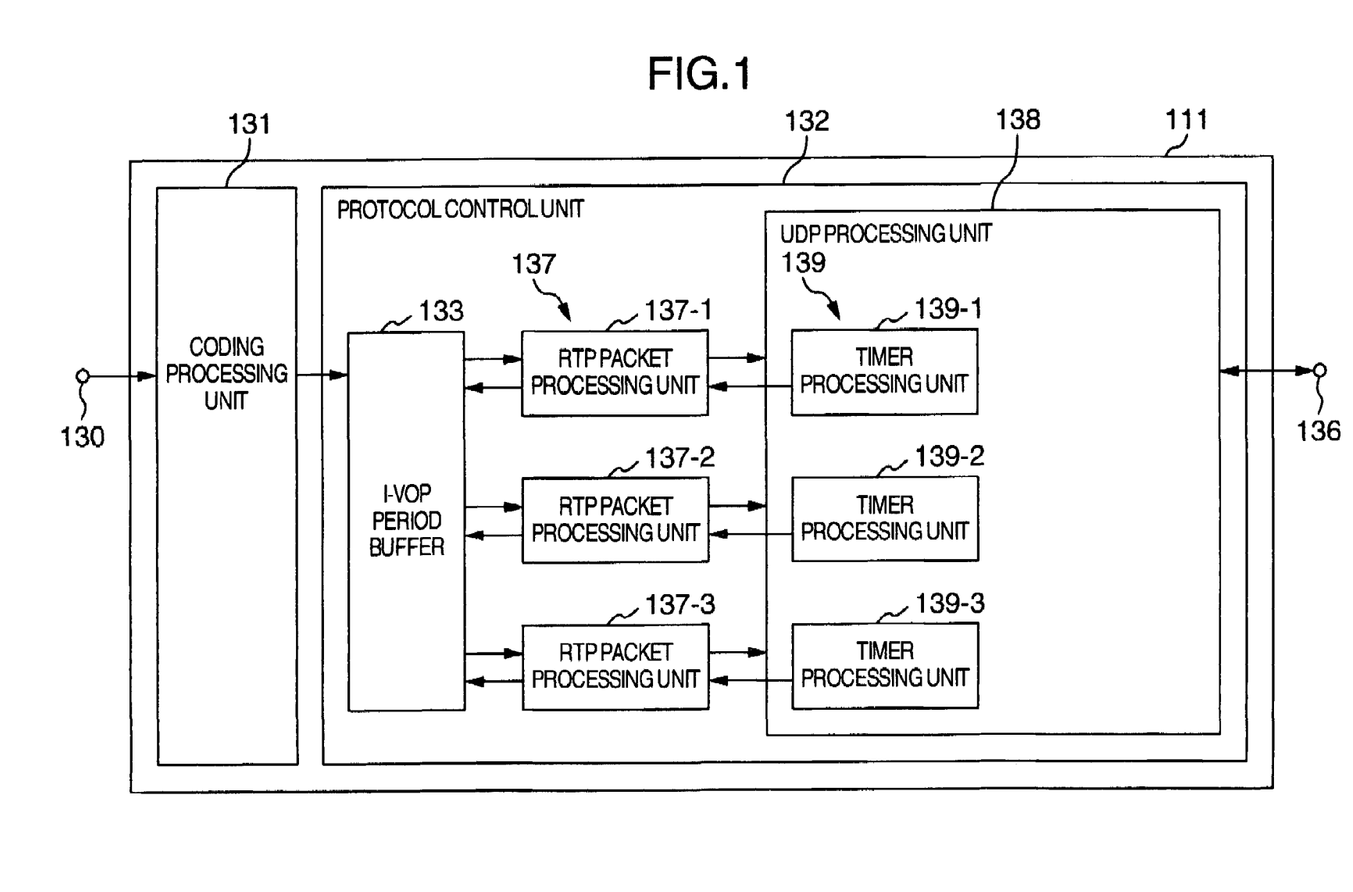
FIG. 1 is a block diagram illustrating one embodiment of the present invention.

FIG. 1 is a block diagram illustrating one embodiment of the present invention. The image transmitter 111 comprises RTP packet processing units 137-1, 137-2, 137-3. They are collectively called the "RTP packet processing unit 137" when they need not be particularly distinguished from one another. The image transmitter 111 also comprises a UDP processing unit 138, and timer processing units 139-1, 139-2, 139-3 ("timer processing unit 139" when they are collectively called). Components identical to those in FIG. 9 are designated the same reference numerals. The image transmitter 111 can also be used in an image delivery system illustrated in FIG. 8, and detailed description thereon has been described, so that the image transmitter 111 will be omitted in the following description.

Referring specifically to FIG. 1, a video signal from a camera 120 is applied to the image transmitter 111 through an input terminal 130. The image transmitter 11 comprises a coding processing unit 131 and a protocol control unit 132. The coding processing unit 131 can be designed in conformity to MPEG-4, MPEG-2, or the like. The protocol control unit 132 comprises an I-VOP period buffer 133; RPT packet processing units 137-1, 137-2, 137-3; and a UDP processing unit 138. The output of the UDP processing unit 138 is transmitted from an output terminal 136 to each network 122.

While FIG. 3 shows three each of the RTP packet processing units and timer processing units, it should be understood that the quantities of these components are not limited to three.

Figure 6:
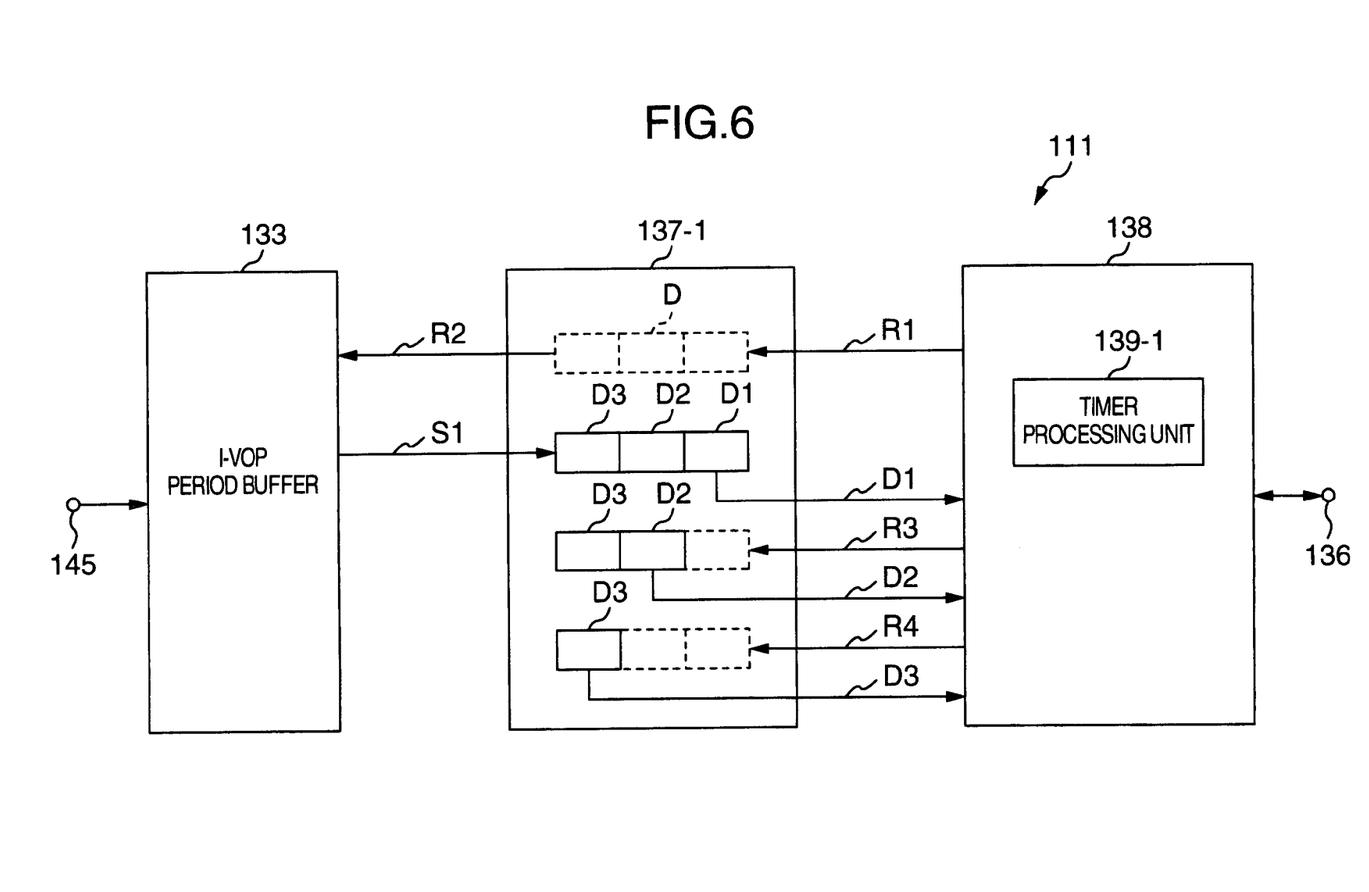
FIG. 6 is a block diagram illustrating the configuration of an image transmitter according to the present invention for explaining the operation thereof.

Next, the operation of the image transmitter 111 will be described with reference to FIG. 6. FIG. 6 is a diagram for explaining the operation of the I-VOP period buffer 133, the RTP packet processing unit 137-1, and the timer processing unit 139-1 of the UDP processing unit 138. An input terminal 145 is applied with encoded image data from the coding processing unit 131. Since the remaining RTP packet processing units 137-2, 137-3 and timer processing units 139-2, 139-3 are similar in operation to their counterparts in FIG. 6, description thereon is omitted.

First, when the bit rate of the network 122 has been previously known, the bit rate of the network 122 is notified to the image transmitter from the image receiver 112 through the terminal 136 upon connection of the network 122. The bit rate may be set into the image receiver 112 through a personal computer or the like. For example, when the image receiver 112-1 is connected to the image transmitter 111 through a network, bit rate information is sent to the UDP processing unit 138. The UDP processing unit 138 sends the bit rate information to the timer processing unit 139-1, such that the timer processing unit 139-1 sets a waiting time in accordance with the bit rate information, i.e., a bit rate waiting time. Upon receipt of a ready signal sent from the UDP processing unit 138, the timer processing unit 139-1 suspends the processing for the bit rate waiting time before it sends the ready signal to the RTP packet processing unit 137-1. For example, when the bit rate waiting time is set to 10 msec, the timer processing unit 139-1 acts to request the RTP packet processing unit 137-1 to send packets (encoded image data transformed into packets for transmission) at intervals of 10 msec upon activation of the system (when initial values are set). A delay time is added to this requesting interval (the initial value of which is equal to the bit rate waiting time) as appropriate based on discard ratio information sent from the transmission path 122. For example, Table 1 shows the relationship between the discard ratio and delay time. Such a table is stored in a memory (not shown) of the UDP processing unit 138.

TABLE 1

| DISCARD | DELAY TIME |
|---------|------------|
| 0 | None |
| 1-10 | 10 ms |
| 11-20 | 20 ms |
| 21-30 | 60 ms |
| . | . |
| . | . |
| . | . |
| 241-255 | 1000 ms |

In Table 1, the discard ratio information is represented in a range of 0 (corresponding to zero percent) to 255 (corresponding to 100%), and respective delay times are set in correspondence thereto. Specifically, the delay time added to the packet requesting interval is increased as the discard ratio is higher, i.e., a delay time of zero msec (normal) is associated with the discard ratio equal to zero; 10 msec with the discard ratio 1-10; 20 msec with the discard ratio 11-20, . . . . Alternatively, a constant delay time, for example, 10 msec, may be added to the requesting interval when the discard ratio is not zero, instead of setting different delay times to respective discard ratios as shown in Table 1. In this way, the delay times set for the discard ratios are preferably determined beforehand through an experiment or the like because the discard ratio can vary due to a variety of factors such as the transmission bandwidth, frequency of utilization, and the like of a particular transmission path.

In FIG. 6, the UDP processing unit 138 first sends a ready signal R1 to the RTP packet processing unit 137-1 for requesting the transmission of a packet D. Upon receipt of the ready signal R1, the RTP packet processing unit 137-1 starts the operation involved in sending the packet D. However, if there is no packet to be sent, the RTP packet processing unit 137-1 generates a ready signal R2 for requesting the I-VOP period buffer 133 for encoded image data S1. Upon receipt of the encoded image data S1, the RTP packet processing unit 137-1 packetizes the encoded image data S1 for storage, and sends the packet D1 to the UDP processing unit 138. The UDP processing unit 138 transmits the packet D1 sent thereto to the transmission path 122 through the output terminal 136. While the RTP packet processing unit 137-1 packetizes the encoded image data S1 into three packets D1, D2, D3 for purposes of illustration, the present invention is not particularly limited to this form of packetization (FIG. 5 for explaining the principle illustrates that each of encoded image data P4, P5, P6, P7 is packetized into four packets.

Next, upon receipt of the packet D1, the UDP processing unit 138 requests the transmission of the next packet D2 through the next ready signal R3. In this event, in the transmission of the ready signal R3 for requesting the packet D2, the UDP processing unit 138 relies on a requesting interval which is set in the timer processing unit 139-1. For example, assuming now that a requesting interval of 10 seconds is set in the timer processing unit 139-1, the UDP processing unit 138 sends the ready signal R3 to the RTP packet processing unit 137-1 10 msec after the packet D1 has been received, forcing the RTP packet processing unit 137-1 to send the next packet D2 to the UDP processing unit 138. Similarly, the UDP processing unit 138 sends a ready signal R4 to the RTP packet processing unit 137-1 in 10 msec, forcing the RTP packet processing unit 137-1 to send the packet D3 to the UDP processing unit 138. In this way, the UDP processing unit 138 is configured to control the timing at which the ready signal R is transmitted for requesting the packet D based on the requesting interval which is set in the timer processing unit 139-1. In addition, the requesting interval set in the timer processing unit 139-1 is increased as appropriate in accordance with the relationship between the discard ratio and delay time shown in the aforementioned Table 1. In the scenario shown in FIG. 6, there is no packet D upon transmission of the ready signal R1, but if there is the packet D, the packet D is transmitted in response to the received ready signal R1, as a matter of course. Also, while the foregoing description has been made on the operation of the timer processing unit 139-1 in the DUP processing unit 138 and the RTP packet processing unit 137-1, the remaining timer processing units 139 and RTP packet processing units 137 are similar in operation to their counterparts, so that description thereon is omitted. In the foregoing manner, distributed encoded image data P3, P4, P5 can be transmitted from the higher bit-rate transmission path 125 to the lower bit-rate transmission path 126 as illustrated in FIG. 5, so that resulting encoded image data P6, P7 on the lower bit-rate transmission path 126 have a smaller number of discarded packets.

The foregoing description has been made for a scenario in which the bit rate of the network 122 has been known beforehand. Conversely, if the bit rate of the network 122 is unknown, the image transmitter 111, or more specifically, the UDP processing unit 138 is notified upon connection to the network 122 that the bit rate of the network 122 is unknown. In this event, the timer processing unit 139 sets the requesting interval for the ready signal R to a previously set minimum waiting time (initial value) of the system. For example, assume herein that the minimum waiting time has been set at 10 msec. In this way, an image delivery system transmits encoded image data from the image transmitter 111 to the network 122 at minimum intervals. This causes the encoded image data to be bursty, giving rise to discarded data upon passage through the lower bit-rate transmission path and a resulting failure in receiving correct data at the image receiver 112. As a result, the image receiver 112 transmits the packet discard ratio information to the UDP processing unit 138 of the image transmitter 111. In the UDP processing unit 138, the timer processing unit 139 sets an appropriate requesting interval for the ready signal R from the table shown in Table 1 based on the discard ratio information. Specifically, the timer processing unit 139 adds a delay time based on the discard ratio information to increase the requesting interval. With this strategy, it is possible to transmit encoded image data from which a reduced number of packets are discarded on the lower bit-rate transmission path, as is the aforementioned case where the bit rate of the network 122 has been previously known.

In the embodiment described in connection with FIG. 1, the network 122 may be temporarily restricted due to an increased amount of information, i.e., an increase in so-called traffic, a failure on the network 122. In this event, the discard ratio increases, causing a lower bit rate on the network for a while. A lower bit rate would cause discarding of more packets, triggering of the aforementioned operation in the embodiment, and a slower delivery of encoded image data. As a result, although the network 122 merely temporarily suffers from a lower bit rate, the DUP processing unit 138 recognizes the network 122 as a low bit-rate transmission path, and increases the packet requesting interval (waiting time) in the timer processing unit 139. In consequence, in spite of a sufficient transmission capacity provided by the network 122 on which the traffic has been reduced or the failure has been fixed (for example, even if the packet discard ratio has been reduced to zero), the longer requesting interval is still used to transmit a less amount of encoded image data, making the available capacity of the line left unused. As such, the strategy described in the foregoing embodiment can be improper for a temporary failure such as increased traffic and a failure on the network.

Figure 2:
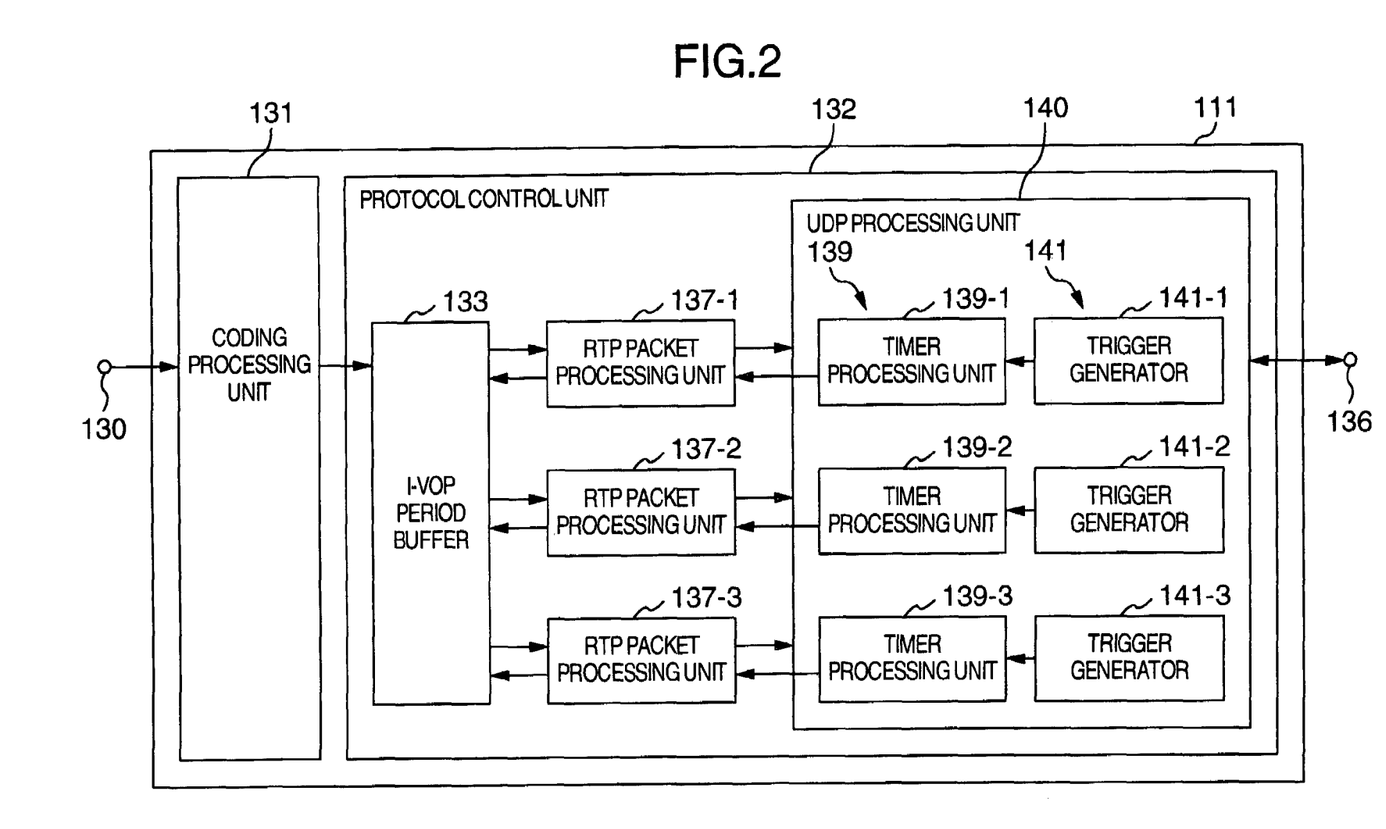
FIG. 2 is a block diagram illustrating another embodiment of the present invention.

Next, another embodiment of the present invention, improved in the foregoing respect, will be described with reference to FIG. 2. In FIG. 2, the image transmitter 111 comprises a UDP processing unit 140 which additionally has a trigger generators 141-1, 141-2, 141-3. The components identical to those in FIG. 1 are designated the same reference numerals. In FIG. 2, a video signal from a camera 120 is applied to the image transmitter 111 through an input terminal 130. The image transmitter 111 comprises a coding processing unit 131 and a protocol control unit 132. The coding processing unit 131 can be designed to comply with another coding scheme such as MPEG-4, MPEG-2 and the like. The protocol control unit 132 comprises an I-VOP (Video Object Plane) period buffer 133; RTP packet processing units 137-1, 137-2, 137-3; and the UDP processing unit 140. The UDP processing unit 140 comprises timer processing units 139-1, 139-2, 139-3; and trigger generators 141-1, 141-2, 141-3. The output of the UDP processing unit 140 is sent to each network 122 from an output terminal 136. While three each of the RPT packet processing units, timer processing units, and trigger generators are shown in FIG. 2, they are not limited in quantity to three.

Next, description will be made on the operation of the embodiment illustrated in FIG. 2. Since the basic operation of the image transmitter 111 is the same as the aforementioned embodiment, the following description will be focused only on a transmission waiting time control implemented by the trigger generators 141. As previously described in the foregoing embodiment, packets are transmitted, for example, from the RTP packet processing unit 137-1 to the UDP processing unit 140 at intervals which are determined by the interval associated with the ready signal. While the interval associated with the ready signal is determined by an interval set by the timer processing unit 139, for example, 10 msec, the packet requesting interval determined by the ready signal is extended by the discard ratio from the network. The trigger generator 141 acts to periodically reduce the extended packet requesting interval determined by the ready signal to return to initial value (that is, above described bit rate waiting time or least waiting time).

Giving an example, the trigger generator 141 acts to reduce the requesting interval set in the timer processing unit 139, for example, by 10 msec each time, at intervals of, for example, one minute, ten minutes, one hour, or 24 hours. Assume, for example, that the trigger generator 141-1 is set to reduce the ready signal requesting interval stored in the timer processing unit 139-1 by 10 msec every hour, the ready signal requesting interval stored in the timer processing unit 139-1 is initially set to 10 msec (initial value), and the ready signal requesting interval has increased to 60 msec in one hour in response to the discard ratio from the network. In this event, a trigger pulse generated by the trigger generator 141-1 is applied to the timer processing unit 139-1 which responsively reduces the ready signal requesting interval stored in the timer processing unit 139-1 by 10 msec, so that the resulting requesting interval is changed (re-set) to 50 msec. Similarly, a trigger pulse from the trigger generator 141-1 is applied to the timer processing unit 139-1 which responsively reduces the ready signal requesting interval stored in the timer processing unit 139-1 by 10 ms to 40 msec. As such operations are repeated, the ready signal requesting interval stored in the timer processing unit 139-1 returns to 10 msec, which is equal to the initial value, in three hours. It should be understood that the requesting interval does not necessarily return to the initial value, and that a set value can be changed due to a variety of factors such as the transmission bandwidth, frequency of utilization, and the like of a particular transmission path. Actually, in the meantime, the ready signal requesting interval can gradually increase in accordance with the discard ratio from the network.

As described above, the trigger generator 141 functions to reduce the ready signal requesting interval stored in the timer processing unit 139. The trigger may be generated at any of various intervals in accordance with the situation of the actual system, such as at intervals of one minute, ten minutes, one hour, or 24 hours, and can be previously stored in a memory (not shown). In the foregoing embodiment, the ready signal requesting interval stored in the timer processing unit 139 is reduced by 10 msec each time. The amount by which the requesting interval is reduced each time may be selected from a variety of values for use in accordance with an actual situation in which a particular system is operating, and can be previously registered in a memory (not shown).

Figure 7:
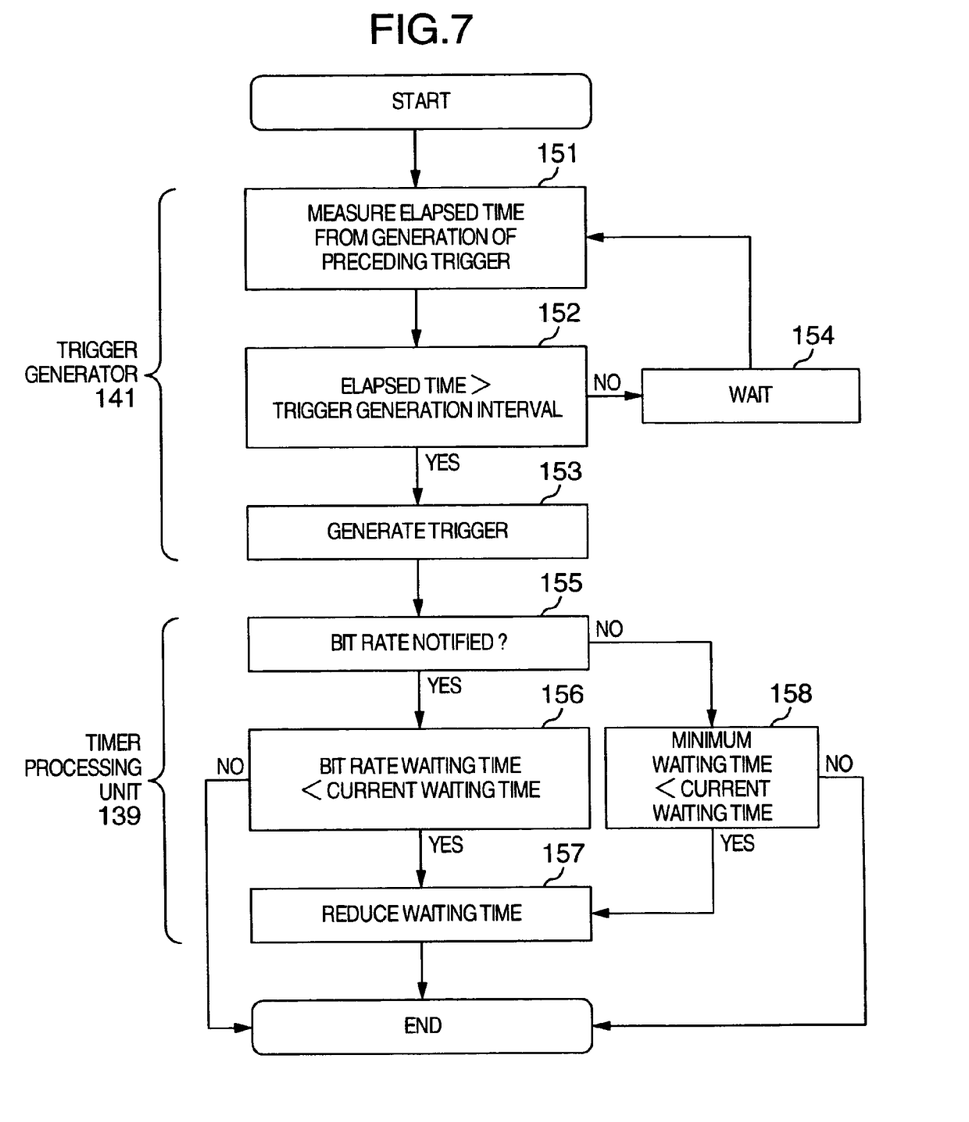
FIG. 7 is a flow chart for explaining the operation of the embodiment of the present invention illustrated in FIG. 2.

The operation will be described in detail with reference to FIG. 7. The trigger generator 141 measures a time elapsed from the generation of the preceding trigger at step 151. At step 152, the trigger generator 141 examines whether or not the elapsed time from the generation of the preceding trigger reaches the trigger generating interval. If the elapsed time has reached the trigger generating interval, the timer processing unit 139 is instructed to generate a trigger (step 153). Conversely, if the elapsed time has not yet reached the trigger generating interval, the trigger generator 141 still awaits (step 154).

Upon receipt of the trigger, the timer processing unit 139 determines at step 155 whether or not the bit rate has been notified from the image receiver 112. When the bit rate has been notified, the timer processing unit 139 compares a current waiting time (requesting interval) with a bit rate waiting time (step 156), and reduces the waiting time if the current waiting time is longer than the bit rate waiting time (step S157). In the reverse case, the waiting time need not be reduced. Also, when the bit rate is not notified, the flow proceeds to step 158, where the timer processing unit 139 reduces the waiting time, when the current waiting time is longer than a minimum waiting time, for example, 10 msc (step S157). In the reverse case, the waiting time need not be reduced.

By repeating the foregoing operations, the waiting time of the timer processing unit 139 can be returned to the original value (initial value) to accommodate a temporary change in the bit rate on the transmission path.

In the foregoing embodiment, the timer processing unit 139 reduces the current requesting interval, for example, by 10 msec each time a trigger is generated. In another embodiment, the timer processing unit 139 may forcibly return the requesting interval to the initial value (bit rate waiting time or minimum waiting time) each time a trigger is generated. In this event, the requesting interval immediately before it is returned to the initial value may be stored in a memory (not shown) of the UDP processing unit 140, such that if the discard ratio immediately after the requesting interval is returned to the initial value is equal to or higher than a predetermined value (for example, equal to or higher than the discard ratio immediately before the requesting interval is returned to the initial value), the requesting interval may be returned to the preceding requesting interval stored in the memory.

TABLE 2

| DISCARD RATIO | REQUESTING INTERVAL |
|---|---|
| 0 (INITIAL VALUE) | 10 ms |
| 1-10 | 20 ms |
| 11-20 | 60 ms |
| 21-30 | 120 ms |
| . | . |
| . | . |
| . | . |

Next, a further embodiment of the present invention will be described with reference to Table 2. The image transmitter 111 is similar in configuration to that illustrated in FIG. 1. In the foregoing embodiment, the timer processing unit 139 adds a delay time to the requesting interval based on the discard ratio using the table shown in FIG. 1 to increase the requesting interval, and separately from this processing, reduces the requesting interval based on the trigger generated at predetermined intervals as illustrated in FIG. 7. In this embodiment, the timer processing unit 139 re-sets the requesting interval as appropriate based on the discard ratio information sent from the transmission path using Table 2 shown above, so that unlike the foregoing embodiment, the requesting interval may be extended or reduced in accordance with variations in the discard ratio. Table 2 shows the relationship between the discard ratio and requesting interval, and such a table is stored in a memory of UDP processing unit 138. In table 2, the discard ratio information is represented in a range of 0 (corresponding to zero percent) to 255 (corresponding to 100%), and respective delay times are set in correspondence thereto. Specifically, the packet requesting interval is set to increase as the discard ratio is higher, i.e., the discard ratio equal to zero is associated with a delay time of zero msec (initial value); 20 msec with the discard ratio 1-10; 60 msec with the discard ratio 11-20, . . . .

For example, when the bit rate of the network is unknown, the timer processing unit 139-1 regards the bit rate as normal upon activation of the system (upon setting the initial value) as it receives a ready signal sent from the UDP processing unit 138, and acts to request the RTP packet processing unit 137-1 for sending packets at a requesting interval corresponding to the discard ratio equal to zero shown in Table 2, i.e., at interval of 10 msec. This requesting interval (waiting time) is changed as appropriate based on the discard ratio information sent from the transmission path.

Therefore, if an increased amount of traffic on the network 122 causes discarded packets, the requesting interval is set in accordance with the discard ratio shown in Table 2. On the other hand, when the increased amount of traffic has been eliminated on the network 122, no packets will be discarded. For example, when the packet discard ratio falls down to zero, the requesting interval is returned to the value corresponding to the discard ratio equal to zero, i.e., the initial value, as shown in Table 1.

When the bit rate on the network 122 has been known, a waiting time suited to bit rate information, i.e., the bit rate waiting time may be set for the initial requesting interval corresponding to the discard ratio equal to zero.

While several embodiments of the present invention have been described in detail, it should be understood that the present invention is not limited to the embodiments of the image transmission method and system herein described, but can be widely applied to image transmission methods and apparatuses other than the foregoing. Also, while the foregoing embodiments have been described in connection with data which is processed in accordance with MPEG-4, MPEG-2 and the like, these schemes are mere examples, and data to be processed by the present invention is not limited to MPEG-based ones.

As appreciated from the foregoing, the present invention provides an image transmission method and apparatus, by way of controlling line speed individually of each transmission line, which can correctly transmit encoded image data requested by a recipient, and reduce the packet discard ratio for the transmission of encoded data from a higher bit-rate transmission path to a lower bit-rate transmission path to enable the transmission of encoded image data. The present invention also provides an image transmission method and apparatus which can transmit encoded image data in an optimal condition even with a temporary failure on a transmission path.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An image transmission apparatus for use with at least two transmission paths having different transmission rates from one another, said apparatus comprising:
   image input means for receiving an image signal;
   a coding processing unit for encoding the image signal;

a protocol control unit for packetizing the data encoded in said coding processing unit for transmission; and transmitting means for transmitting the data packets created by said protocol control unit, wherein said protocol control unit having at least one timer processing unit which is configured to control a transmission interval at which said data packets are individually transmitted corresponding to the transmission rate of a particular transmission path based on data packet discard ratio information of said transmission path and a trigger pulse generation interval, wherein said protocol control unit further includes a trigger generator which is configured to generate a trigger pulse for re-setting said timer processing unit at predetermined time intervals, thereby defining the trigger pulse generation interval, wherein said timer processing unit, in accordance with the trigger pulse generated by said trigger generator, controls delayed data packet transmission processing in accordance with a delay time corresponding to a particular discard ratio of said data packet discard ratio information to return to an original transmission interval.

2. An image transmission apparatus according to claim 1, wherein said protocol control unit has a table which sets the delay time corresponding to a particular discard ratio in said data packet discard ratio information, and wherein said timer processing unit delays the delivery of data packets in accordance with a delay time in said table corresponding to the data packet discard ratio information from said transmission path.

3. An image transmission apparatus according to claim 1, wherein said protocol control unit has a table which sets a data packet transmission requesting interval corresponding to a particular data packet discard ratio in said data packet discard ratio information, and wherein said timer processing unit controls the transmission of data packets in accordance with a requesting interval in said table corresponding to the data packet discard information from said transmission path.

4. An image transmission method for transmitting encoded image data in the form of packet over at least two transmission paths having different transmission rates from one another, said method comprising the steps of:

receiving an image signal;

converting the image signal into encoded data;

packetizing the encoded data to generate packet data for transmission;

setting a transmission interval based on data packet discard ratio information of said transmission paths;

transmitting the packet data at the set transmission intervals individually corresponding to the transmission rate of each said transmission path and a trigger pulse generation interval, generating a trigger pulse at predetermined time intervals to re-set the transmission interval at predetermined time intervals, thereby defining the trigger pulse generation interval, and controlling delay of data packet transmission processing in accordance with a delay time corresponding to a particular discard ratio of said data packet discard ratio information to re-set to an original transmission interval based on said trigger pulse.

5. An image transmission method according to claim 4, further comprising the step of:

delaying the delivery of data packets in accordance with the delay time corresponding to the data packet discard ratio information from said transmission path based on a table which sets a delay time corresponding to a particular discard ratio in said data packet discard ratio information.

6. An image transmission method according to claim 4, wherein said step of transmitting the data packets at the set transmission interval includes controlling the transmission of the data packets in accordance with a data packet transmission requesting time corresponding to data packet discard ratio information from said transmission path based on a table which sets a data packet transmission requesting time corresponding to a particular discard ratio in said data packet discard ratio information.

* * * * *